United States Patent Office 3,646,193
Patented Feb. 29, 1972

3,646,193
IgA ANTIBODY FROM LACTEAL FLUIDS
Joseph B. Michaelson, 6732 Coldwater Canyon, North Hollywood, Calif. 91606, and John W. Short, 1055 Grover St., Glendale, Calif. 91201
No Drawing. Continuation of application Ser. No. 685,949, Nov. 27, 1967, which is a continuation-in-part of application Ser. No. 451,961, Apr. 29, 1965. This application July 25, 1969, Ser. No. 848,400
Int. Cl. A61k 27/00
U.S. Cl. 424—85
8 Claims

ABSTRACT OF THE DISCLOSURE

A new IgA antibody, a lactimmunin, has been discovered. Uniquely, the new product, derived from immune lacteal fluids such as milk whey or colostrum, confers passive immunity without sensitizing effects even when administered parenterally. The product is prepared by selectively cleaving the relatively large lacteal fluid derived antibody molecules into relatively smaller constituents having either allergenic or antibody properties and isolating the nonallergenic, antibody constituent. The cleaving is easily accomplished by proteolytic digestion of the immune lacteal fluid.

CROSS-REFERENCE TO RELATED APPLICATION

This application is a continuation of our copending application, Ser. No. 685,949, filed Nov. 27, 1967, and now abandoned, which in turn is a continuation-in-part of our application Ser. No. 451,961, filed April 29, 1965, and now abandoned.

BACKGROUND OF THE INVENTION

(1) Field of the invention

This invention is concerned with novel antibody composition. More particularly the invention relates to new IgA antibody materials and methods of preparation and use.

Antibodies are generated in humans and animals in response to the presence of antigens in the host organism. It is known to confer immunity on an organism by administering an antibody formed elsewhere. This so-called passive immunity is generally achieved by the parenteral, oral or rectal introduction into the organism body of the antibody. Antibodies can be formed for numerous specific pathogens by inoculating the antibody-former with the specifically appropriate antigen.

(2) Prior art

Derivation of antibodies from the milk of a cow or goat, has been proposed. Although the quantity of antibodies to be had from this source is staggering, practical utilization has not been realized. One worker in the field long ago suggested intravenous injection of the specific antigens into a bovid to be followed by separation of the antibody from the animal along with the milk produced. The obtained milk was to be treated to concentrate the immune portion and this portion was proposed to be administered orally. See A. Holm, abandoned patent application Ser. No. 628,987 filed Nov. 15, 1945.

Oral administration requirements have limited the commercial usefulness of the antibody products produced by Holm. Intravenous, intradermal or other parenteral administration of this product occasions a sensitizing reaction, akin to serum-sickness and even anaphylaxis.

The present situation is then that a vast potential source of antibody is today untapped because at the existing state of the art milk product derived antibodies must be administered orally or rectally either of which is commercially infeasible or sensitization of the patient likely results.

SUMMARY OF THE INVENTION

It has now been discovered that an effective, nonallergenic IgA antibody composition consists essentially of that portion of the products of the proteolytic digestion of immune lacteal fluids selected from milk whey and colostrum which is initially elutable from said products in a carboxymethyl cellulose column by an elutant composed of equivolume amounts of aqueous 0.01 M and 0.20 M solutions of sodium dihydrogen phosphate.

The just-described portion is herein termed a "lactimmunin" and is a new product having a molecular weight between 40,000 and 100,000, by freezing point depression measurement. It is further characteristic of the lactimmunin that it is substantially homogenous and free of allergenic material.

The foregoing antibody composition is applicable parenterally to subjects to confer passive immunity thereon e.g. in a dosage comprising the composition in a pharmaceutically acceptable carrier.

Method of treating warm-blooded organisms is provided to confer thereon a desired passive immunity which includes administering to the organism in a pharmaceutically acceptable carrier the IgA antibody composition above described, suitably by parenteral administration.

Preparation of this IgA antibody composition to be free of sensitizing properties, when administered parenterally, from immune lacteal fluids selected from milk whey and colostrum (previously separated from their raw natural antecedants) may be carried out by cleaving the contained IgA antibody molecules into smaller molecules having characteristic immune or sensitizing properties and isolating the immune molecules (IgA antibody) from other molecular species present, thereby removing sensitizing factors. Proteolytic digestion of the lacteal fluids accomplishes the cleavage and the isolating step may be effected by eluting with a suitable eluant.

DESCRIPTION OF THE PREFERRED EMBODIMENTS

Example 1

One gram of dried colostrum immunized with a virulent *Staphylococcus aureus*, was hydrolyzed with 10 mg. of a proteolytic enzyme (papain) for 16 hours. The non-diffusable digestion product obtained after dialysis against 0.5 M sodium acetate buffer pH 5.5 was then eluted on a carboxymethyl cellulose column. Elution was accomplished with the use of a bigradient buffer system consisting of 0.01 M sodium dihydrogen phosphate (pH 6.4) and 0.2 M sodium dihydrogen phosphate (pH 6.20). The total volume of buffer system used to elute the varying fractions from the non-diffusable digestion products was 1200 milliliters. The absorption spectrum of the column effluent using 280 mv. light was monitored continuously and the first product (showing a peak value between 80 and 130 milliliters of elutant) was taken off.

Molecular weight determination was made for the product using the function of colligative properties in the form of the depression of the freezing point as the test method. The method used was that of Cohn and Conant (Cohn, E. F. and Conant, F. B., Proc. Nat. Acad. Sci., 12: 433, 1926). The product was found to have a molecular weight between 40,000 and 100,000.

The product was tested for immunological effectiveness as follows.

A test solution was prepared by placing 140 milligrams of the product in 2.0 ml. of sterile saline.

An 18-hour old culture of a pathogenic strain of *Staphylococcus aureus* was used. The Hagen Number 1

Culture used was grown on Todd-Hewitt Broth, centrifuged, and washed three times in saline. The culture was then suspended in saline for use.

Testing was conducted on albino female rabbits weighing between 4–5 pounds.

Testing procedure: One pair of animals was inoculated with 1/20 of a ml., or approximately one billion bacteria, injected subcutaneously into the left and right ear of the rabbits. A second pair were a control. Six hours following the inoculation of the organism, the above obtained product was injected in a concentration of 70 mg. in 1.5 ml. of sterile physiological saline and injected intraperitoneally into each rabbit. The animals were then observed at 24 hours, 48 hours, 72 hours, 4 days and 5 days and evaluated on the basis of erythema, edema, area involved, localization of the abscess and induration of the surrounding tissues.

Results

Immunology: 24 hour evaluation.

Treated: Very slight erythema and edema.
Control: Pronounced erythema and edema involving 2/3 of the ear.

48 hour observation.

Treated: No erythema or edema, no evidence of an abscess.
Control: Pronounced erythema and edema involving approximately 2/3 of the ear with induration of surrounding tissue.

Skin sensitization: Skin sensitization was carried out using male albino guinea pigs as the test animal. Groups of 4 animals were selected and divided into treated and control groups.

The hair was clipped from each animal on a weekly basis. A 0.1% weight volume solution of 2.4 dinitro-1-chlorobenzene in normal saline was injected into one side of the trunk of each control animal and the vehicle, normal saline, was injected into the other side of the trunk. The control and test materials and their vehicles, normal saline, were injected intracutaneously three times per week until a total of ten injections had been given. A challenge injection was administered two weeks following the tenth injection. The volume of the doses was 0.05 ml. for the first injection, 0.1 ml. for the next nine injections and 0.05 ml. for the challenge injection. The injection sites were examined for irritation at 24 and 48 hours after the administration of each dose. Evaluation was done as follows: if the degree of irritation produced by the challenge injection of the test materials was substantially higher than the average produced by the first ten injections then the material was considered to have produced sensitization.

Results—sensitization studies: Observations following 6 hours after the challenge injection.

Treated group: Very slight erythema, less than 0.5 cm. in diameter, non-sensitizing.
Control group: Sensitized—erythema and edema, 1 to 2 cm. in diameter.

All skin reactions had subsided at 24 hours.

As the above example clearly demonstrates, the lactimmunin separable from colostrum by elution on a carboxy methyl cellulose (CMC) column with appropriate elutants is a highly effective antibody, and nonsensitizing.

The lactimmunin is separable by virtue of its characteristically different electronic charge as compared with other digestion products of milk whey or colostrum.

As is known, proteins are composed of amino acids linked in peptide chains. Some of these amino acids contain acidic groups and others basic groups which are not involved in peptide linkages. Consequently protein molecules contain numbers of both free acidic and basic groups. The acidic groups of proteins are in the form of carboxyl groups (expressed in chemical symbols as —COOH) and the basic groups in the form of amino groups (expressed in chemical symbols as —$NH_2$).

In general, the numbers of acidic groups and basic groups of a protein are not equal and when the protein is placed in water or neutral salt solutions it dissociates more hydrogen ions (H+) from acid groups than hydroxyl ions (OH—) from basic groups or vice versa. In most proteins the acidic groups exceed the basic groups.

When a protein is placed in pure water, it undergoes both acidic and basic dissociations. Since however, the protein generally contains an excess of acidic or basic groups the solution is not neutral because acidic or basic dissociation predominates. If a protein dissociates to give more H+ than OH— ions it exists as protein ($p-$) and then by carefully adding acid to increase the H+ ions the acidic dissociation of the protein is depressed until it equals the basic dissociation, that is protein+ =protein— ($p+=p-$). The converse also holds true. At this point the net charge of the protein is zero and is said to be at its isoelectric point i.e. the pH where the total dissociation of the protein to give protein+ and protein— is least. Addition of acid or base to a protein at its isoelectric point will alter the net charge of the protein. Addition of base will remove H+ ions and result in the formation of a negatively charged protein. Addition of acid (H+) to a protein at its isoelectric point will result in the removal of OH or basic groups to form water and produce a protein possessing an overall positive electric charge.

The isoelectric pH of a protein is of great importance in relation to the physical and chemical properties of the protein. In general, the properties of a protein have minimum values at its isoelectric pH. At this pH the protein is least ionized, least soluble, and shows the least electrical conductivity.

Due to these characteristics, proteins are separable one from another across an ionic medium by varying the pH condition of an elutant, that is, by altering the pH condition of a material, such as CMC, and thus the relative electronic attraction between various of the proteins and the CMC. It has been found that the immune nonallergenic IgA protein, herein termed a lactimmunin, has a characteristic grouping of acidic and basic groups which enables its separation first from other proteinaceous codigestion products of milk whey or colostrum on a CMC column using a specified elutant. Thus while various elutants and column materials may be used for separation in practice, the definitive separation of lactimmunin from other protein which are either biologically ineffective or allergenic in use is that using a CMC column and the above specified bigradient elutant.

Molecular weight of the various protein molecules is of course a factor in their movement through a column, but not so importantly as electronic (acid-base) characteristics, as reflected in the isoelectric point pH value and separation sequence with appropriate elutants.

Following elution the elutant-protein mixture (solution) is optically measured e.g. at 280 m$\mu$ for absorption characteristics. This establishes the existence and quantity of eluted proteins by proportional variations in the optical density of the column effluent. Typically, one gram samples of milk whey digestate containing the lactimmunins are eluted from a CMC column with the first 80 to 130 milliliters of the above-specified bigradient elutant. Further quantities of elutant separate other proteins, which are either biologically inactive or allergenic and which are thus not of interest.

Preliminary to isolation of the lactimmunin the natural product, whether it contains colostrum which is a component of the first milk secreted by a mammal in the few days following parturition of milk whey, the watery part of milk, is heated to separate the whey or colostrum from the thick coaguable milk components, chiefly fats and casein. This may be accomplished by alcohol precipitation or centrifugal separation or otherwise. See A. Holm (above-identified) for procedures useful in preparing the preliminary product for treatment in accordance with the present invention. See also Gerlough USP 2,368,464.

A procedure typically employed for purposes of the present invention is as follows:

Milk is defatted in a centrifugal cream separator. The resultant skim milk is acidified with HCl (0.1 N) to pH 4.6 and the casein precipitate removed. Then $(NH_4)_2SO_4$ crystals are added, with constant stirring, to bring the salt concentration to 33% and the precipitating globulin allowed to flocculate for two hours at room temperature. The precipitate is then recovered by centrifuging (1800 r.p.m. for 30 minutes) and decanting the supernate. The supernate is placed in dialysis tubing, and dialyzed against cold running tap water for two days. The contents of the dialysis tubing is frozen and vacuum dried to a white powder which is the starting material. The preparation process is identical in the case of colostrum.

Purified and/or dried colostrum or whey thus obtained is dissolved in a buffer solution at desired pH and molarity. Concentrations of buffer solutions are effective between 0.01 molar to 5.0 molar (M). Examples of buffer systems usable are sodium dihydrogen phosphate, phosphoric acid, potassium acid phosphate, acetic acid, sodium acetate, potassium dihydrogen phosphate, disodium hydrogen phosphate, sodium borate, hydrochloric acid or sodium hydroxide, etc.

To the buffer solution is added the desired amount of proteolytic enzyme for the purpose of digesting of whey globulin or colostrum globulin molecule. Enzymes utilizable are of the proteolytic type, examples are papain, bromelin, pepsin, chymopapain, ficin, cathepsin, trypsin, chymotrypsin, etc. Mixtures of buffered colostrum or milk whey and enzymes are incubated from periods of from 2 hours to 24 hours at temperatures from 25° C. to 60° C. depending on the concentration of each of the constituents, whey or colostrum and enzyme, in the system. Concentrations of materials used in terms of enzyme and whey or colostrum may vary from a total 10 milligrams up to hundreds of grams with the ratio of enzyme to whey or colostrum being in the order of 1:10 to 1:500 or better. Molarity (gram molecular weights of buffer salts per 1000 grams of solvent or water) may vary from 0.01 up to 1.0.

Surprisingly digestion with proteolytic enzymes cleaves lactoglobulins (whey or colostrum) in a manner giving several products of widely differing characteristics. Prior digestion of globulins e.g. of immune gamma globulin (an IgG molecule) as disclosed in R. R. Porter "The Hydrolysis of Rabbit γ-Globulin and Antibodies with Crystalline Papain," Biochemical Journal 73, pp. 119–126 (1959) was found to give two biologically active fragments and a third apparently biologically inert fragment. Of course, lactoglobulins (IgA) are distinct from gamma globulins (IgG). Chodirker and Tomasi, Jr. have reported in Science 142, pp. 1080–1081 that colostrum contains no IgG constituent, cf. Table 1, page 1081. Accordingly it was completely unexpected that various digestion products of lactoglobulins from milk-whey or colostrum could be obtained and, if obtained, would differ in immunological properties. Such is the case, however, as the examples hereinafter demonstrate. In fact it has been found that IgA immune protein may be cleaved in a manner providing different protein products, one of which products is unique in its immunocological and nonallergenic character. The precise nature of this product is not known, however, it is known that elution of a dialyzed lactoglobulin proteolytic digestate with the buffer solutions specified first separates the protein of interest. The co-products, A and B are allergy producing or not antibody in nature.

Following digestion, the digestion product is dialyzed against acid water of buffer solutions. Dialysis is the process by which colloidal substances are separated from each other and from crystalloids by their different rates of diffusion through membranes or septa. Membranes commonly used are parchment paper, sausage skin, cellulosics, cellophane, millipore filters, and the like.

Dialysis solutions are used to remove diffusable materials from mixtures. Diffusable materials are those small enough to pass through a membrane filter or molecular sieve. The composition of a dialysis solution may vary from pure water to salt solutions, and/or acid or alkali solutions, to organic solvents depending on the material to be dialyzed. The water is acidified with acid varying in concentration from 0.01 Normal to 1.0 Normal. Acids utilized are primarily monocarboxylic and include acetic, propionic and butyric acids as well as lactic acid and the like. Dialysis is continued until only non-diffusable digestion products remain (approximately 24–72 hours dialysis period).

The dried, dialyzed, non-diffusable products are then separated by any of several methods. The method which we have found to be most efficient, is as follows: Columns of nonionic, cationic, or anionic resins such as carboxymethyl cellulose, modified dextrins of microbial origin (trade name Sephadex) or dextrins which have had introduced into them diethyl-aminoethyl groups, are prepared in glass tubular columns (dimensions 2.4 cm. x 35 cm. to 10 cm. x 50 cm.). Prior to packing the columns, the resin material is washed with desired buffer (e.g. 0.01 M $NaH_2PO_4$, pH 6.4) at desired pH. Treating the column in this manner produces sodium dihydrogen phosphate carboxymethyl cellulose which facilitates the bonding or protein hydroxyl groups and hydrogen groups.

Small quantities of the dried non-diffusable products of digestion (0.1–5 gm.) are dissolved in appropriate buffer adjusted to pH 6–7. A quantity is placed on the surface of the column material where the samples are allowed to adsorb. Then the sample is eluted by passing through the column a desired volume (any volume which effectively produces separation which can vary from 75 to 100 mls. to 5000 mls.) of buffer adjusted to pH 6.0–7.0 (approximating the isoelectric point of the proteins). A bigradient buffer (0.01 M $NaH_2PO_4$, pH 6.4 to 0.2 M $NaH_2PO_4$, pH 6.2) system is used. In a bigradient elution system, buffers of different molarity are used. The elutant buffers are mixed in a mixing chamber attached to the column and then forced through the column under positive pressure e.g. 5–15 pounds per square inch gauge or by gravity flow. As the elutants pass through the column, 1–10 ml. fractions are collected at a flow rate of 1 drop/ 10 seconds to 1 drop/2 seconds.

The product of the elution may be analyzed for protein concentration by ultraviolet absorptive properties, at wavelengths of between 250 mμ–300 mμ and preferably 280 mμ.

Example 2

For illustrative and comparative purposes, the procedures of Example 1 are followed and the results of that example are integrated with additional data in this Example 2.

Milk whey and colostrum, after separation from their raw sources, were dialyzed and vacuum dried and then digested with papain. Several different protein molecules were obtained on eluting the digestion product on CMC with the bigradient system composed of equivolume amounts of aqueous 0.01 M and 0.20 M sodium dihydrogen phosphate solutions. The first, herein termed a lactimmunin, was tested as were the co-products A and B, other protein molecules of the digestion.

The molecules thus obtained were subjected to testing in animals to determine their immunological properties and their allergic sensitizing effects. Two tests are utilized for this work. One evaluates skin sensitization effects and the other the ability of the fractions to protect against disease processes (immunological property).

Skin sensitization was tested using the guinea pig as the test animal. The method of testing utilized was the modified Lansteiner technique (Lansteiner, K. and Jacobs, J. of Exptl. Med. 61:643, 1935), an accepted standard method for evaluating skin sensitization properties.

The modified Lansteiner technique for skin sensitization is based on the ability of a substance to produce irritation when injected repeatedly into the skin of a test animal. The procedure is accomplished by injecting intracutaneously the material in question into one side of the trunk of an animal and a known sensitizing agent into the other side of the trunk of the animal. The sensitizing effect is evaluated on the basis of the degree of irritation produced by the material in question relative to the known sensitizing agent.

Testing for immunological properties was carried out by the following method.

A pathogenic strain of bacteria was grown on culture media and prepared for injection to a rabbit. The animals were inoculated subcutaneously with a predetermined number of bacteria to produce infection in vivo. The product or products to be tested for immunological properties are dissolved in physiological saline (0.85% solution of NaCl in $H_2O$) and injected into the animal by any of the following routes: intracutaneously, subcutaneously, intramuscularly, or intraperitoneally. The efficacy of the product is evaluated by the ability of the product to prevent and/or contain the infection.

Specifically, one gram of dried colostrum and one gram of dried cow milk whey immunized with a virulent *Staphylococcus aureus*, were separately cleaved by digestion with 10 mg. of papain for 16 hours. The digestion products obtained after dialysis against 0.5 M sodium acetate buffer (pH 5.5) were separated using a carboxymethyl cellulose (CMC) column.

Elution was accomplished with the use of a bigradient buffer system consisting of 0.01 M sodium dihydrogen phosphate (pH 6.4) and 0.2 M sodium dihydrogen phosphate (pH 6.20). The total volume of buffer system used to elute the several protein products was 1200 mls. Three proteins were obtained from digested milk whey and three proteins were obtained from digested colostrum. These proteins fractions were labeled lactimmunin, co-product A and co-product B in the order in which they were eluted.

The proteins were tested for sensitization effects and immunological effects by the methods described above. The results are as follows.

Skin sensitization: Skin sensitization was carried out using guinea pigs as the test animal. A total of 36 male albino guinea pigs were selected and divided into the following groups, each containing 4 animals.

Type:

Ex. 2 Group 1: Digested colostrum IgA globulin containing lactimmunin.
Control Group 2: Digested colostrum IgA globulin containing co-product A.
Control Group 3: Digested colostrum IgA globulin containing co-product B.
Control Group 4: Non-digested colostrum globulin.
Ex. 2 Group 5: Digested milk whey IgA globulin containing lactimmunin.
Control Group 6: Digested IgA globulin milk whey containing co-product A.
Control Group 7: Digested IgA globulin milk whey containing co-product B.
Control Group 8: Non-digested milk whey IgA globulin.
Control Group 9: No antibody.

The hair was clipped from each animal on a weekly basis. A 0.1% weight volume solution of 2.4 dinitro-1-chlorobenzene in normal saline was injected into one side of the trunk of each control animal and the vehicle, normal saline, was injected into the other side of the trunk. The control and test materials and their vehicles, normal saline, were injected intracutaneously three times per week until a total of ten injections had been given. A challenge injection was administered two weeks following the tenth injection. The volume of the doses was 0.05 ml. for the first injection, 0.1 ml. for the next nine injections and 0.05 ml. for the challenge injection. The injection sites were examined for irritation at 24 and 48 hours after the administration of each dose. Evaluation was done as follows: if the degree of irritation produced by the challenge injection of the test materials was substantially higher than the average produced by the first ten injections then the material was considered to have produced sensitization.

Results—sensitization studies: Observations following 6 hours after the challenge injection.

Type:

Ex. 2 Group 1: Very slight erythema, less than 0.5 cm. in diameter, non-sensitizing.
Control Group 2: Local erythema and edema, 0.15 to 1.0 cm. in diameter, questionable sensitization.
Control Group 3: Erthema and edema, 102 cm. in diameter, sensitized.
Control Group 4: Local erythema and edema, 1.0 to 1.5 cm. in diameter, sensitized.
Ex. 2 Group 5: Local slight erythema, 1.5 cm. in diameter, non-sensitizing.
Control Group 6: Erythema and edema, 0.5 to 1.0 cm. in diameter, sensitizing.
Control Group 7: Erythema and edema, 1 to 2 cm. in diameter.

Other controls, undigested products or the products heretofore administered as antibody cf. Holm identified above, were sensitizing. It is thus clearly demonstrated that proteolytic cleavage of suitably prepared IgA globulins overcomes the sensitization problem heretofore associated with milk derived immune bodies.

Conclusion:

The lactimmunins of the digested globulin and whey had no sensitization effect.
Co-product A of the digested globulin and whey was a sensitizer.
Co-product B of the digested globulin and whey was a sensitizer.

Having showed the absence of sensitizing we turn to a demonstraton of immunocological effectiveness.

Testing for immunological properties:
Antibody function was determined as follows:

Test solutions were prepared by placing 140 milligrams of each protein from milk whey and globulin in 2.0 ml. of sterile saline.

An 18 hour old culture of a pathogenic strain of *Staphylococcus aureus* was used. The Hagen Number 1 Culture used was grown on Todd-Hewitt Broth, centrifuged, and washed three times in saline. The culture was then suspended in saline for use.

Testing was conducted on albino female rabbits weighing between 4–5 pounds. The animals were divided into the following groups with 2 animals per group.

Type:

Ex. 2 Group 1: Digested globulin containing lactimmunin.
Control Group 2: Digested globulin containing co-product A.
Control Group 3: Digested globulin containing co-product B.
Control Group 4: Non-digested colostrum globulin.
Ex. 2 Group 5: Digested milk whey, containing lactimmunin fraction 1.
Control Group 6: Digested milk whey containing co-product A.
Control Group 7: Digested milk whey containing co-product B.
Control Group 8: Non-digested milk whey.
Control Group 9: No antibody.

Testing procedure: The animals were inoculated with 1/20 of a ml. or approximately one billion bacteria, injected subcutaneously into the left and right ear of all 27 rabbits. Six hours following the inoculation of the organism, the various proteins were injected. 70 mg. of each protein were dissolved in 1.5 ml. of sterile physiological saline and injected intraperitoneally into each rabbit. The animals were then observed at 24 hours, 48 hours, 72 hours, 4 days and 5 days and evaluated on the basis of erythema, edema, area involved, localization of the abscess, and induration of the surrounding tissues.

Tabulation of these test results appears in the following:

TABLE I.—TABLE OF SENSITIZING OF IMMUNOLOGICAL PROPERTIES

| | Sensitizing effects | Immunological effects based on 5 day average |
|---|---|---|
| Digested globulin containing lactimmunin, only | O | XXXX* |
| Digested globulin containing co-product A only | XX | XX* |
| Digested globulin containing co-product B only | XXXX | O* |
| Non-digested globulin | XXX | XXX* |
| Digested milk whey fraction containing lactimmunin, only | O | XX* |
| Digested milk whey fraction containing co-product A, only | XX | X* |
| Digested milk whey fraction containing co-product B, only | XX | O* |
| Non-digested milk whey | XXX | XX* |

NOTE.—O=No sensitizing effect; X=Very slightly sensitizing; XX=Slightly sensitizing; XXX=Moderately sensitizing; XXXX=Severely sensitizing; O*=No protection; X*=Very slight protection; XX*=Slight protection; XXX*=Moderate protection; XXXX*=Good protection.

Results

Immunology: 24 hour evaluation:

Type:

Ex. 2 Group 1: Very slight erythema and edema.

Control Group 2: Pronounced erythema and edema, slightly less than the control group 9.

Control Group 3: Pronounced erythema and edema, less than the control group 9.

Control Group 4: Less erythema and edema than the control group 9.

Ex. 2 Group 5: Much less erythema and edema than the control group 9.

Control Group 6: Same as the control group 9.

Control Group 7: Slightly less erythema and edema than the control group 9.

Control Group 8: Same as the control group 9.

Control Group 9: Pronounced erythema and edema involving ⅔ of the ear.

48 hour observation:

Type:

Ex. 2 Group 1: No erythema or edema, no evidence of an abscess.

Control Group 2: Same as the control group 9.

Control Group 3: Same as the control group 9.

Control Group 4: Much less erythema and edema than the control group 9. Very small abscess which appears to be localized.

Ex. 2 Group 5: Much reduced erythema and edema, left ear of one animal healed.

Control Group 6: Small open lesions on both with erythema and edema same as the control.

Control Group 7: Same as control group 9.

Control Group 8: Good localization of abscess with reduction of erythema and edema.

Control Group 9: Pronounced erythema and edema involving approximately ⅔ of the ear with induration of surrounding tissue.

We claim:

1. A parenterally applicable passive immunity conferring dosage comprising a pharmaceutically acceptable carrier and an effective amount of a nonsensitizing, parenterally applicable IgA antibody produced by the process which includes fractionating lactoglobulin molecules derived from immune lacteal fluid into multiple fractions having differing allergenic and immunological properties by digesting the lactoglobulin with a proteolytic enzyme in a 0.01 to 5 M buffer solution at a temperature between about 25° C. and 60° C. for about 2 to about 24 hours, dialyzing the digestion products to separate therefrom diffusable products, and separating from the nondiffusable digestion products comprising said fractions an IgA antibody characterized by having a freezing point depression molecular weight between 40,000 and 100,000, and by being homogeneous, free of allergenic material and initially elutable from other nondiffusable digestion products in a carboxymethyl cellulose column by an elutant composed of equivolume amounts of aqueous 0.01 M and 0.20 M sodium dihydrogen phosphate solutions.

2. Dosage according to claim 1 in which said proteolytic enzyme is selected from papain, bromelin, pepsin, chymopapain, ficin, cathepsin, trypsin and chymotrypsin.

3. Dosage according to claim 1 in which said enzyme is present in an amount of one part by weight per 10 to 500 parts by weight of lactoglobulin.

4. Dosage according to claim 1 in which said lacteal fluid is free of IgG constituents.

5. Dosage according to claim 1 in which said IgA antibody free of allergenic material is further characterized by elution with the first 80 to 130 milliliters of said eluant per gram of nondiffusable digestion products.

6. Dosage according to claim 1 in which said enzyme is papain.

7. Method of treating warm-blooded organisms to confer a desired passive immunity thereon which includes administering to said organism in a pharmaceutically acceptable carrier an effective amount of a nonsensitizing IgA antibody produced by the process which includes fractionating lactoglobulin molecules derived from immune lacteal fluid into multiple fractions having differing allergenic and immunological properties by digesting the lactoglobulin with a proteolytic enzyme in a 0.01 to 5 M buffer solution at a temperature between about 25° C. and 60° C. for about 2 to about 24 hours, dialyzing the digestion products to separate therefrom diffusable products, and separating from the nondiffusable digestion products comprising said fractions an IgA antibody characterized by having a freezing point depression molecular weight between 40,000 and 100,000, and by being homogeneous, free of allergenic material and initially elutable from other nondiffusable digestion products in a carboxymethyl cellulose column by an elutant composed of equivolume amounts of aqueous 0.01 M and 0.20 M sodium dihydrogen phosphate solutions.

8. Method according to claim 7 in which administration is parenteral.

References Cited
UNITED STATES PATENTS

| | | | |
|---|---|---|---|
| 2,123,198 | 7/1938 | Parfentjev | 424—87 |
| 3,046,198 | 7/1962 | Harper | 167—78 Phy |
| 3,073,747 | 1/1963 | Reid | 167—78 |

FOREIGN PATENTS

| | | | |
|---|---|---|---|
| 837,695 | 6/1960 | Great Britain | 167—78 MA |

OTHER REFERENCES

R. M. Porter: The Role of Plasma Cells in the Production of Globulins Within the Mammary Gland and Time Studies on Anitbody Response From Experimentally Induced Inflammation of the Udder, A Thesis submitted to the Graduate Faculty of the University of Minnesota, August 1951, pp. 2–7.

R. R. Porter: Biochemical Journal, vol. 73, pp. 119–126, September 1959.

Sober et al.: Journal of the American Chemical Society, vol. 76, pp. 1711–1712, March 1954.

RICHARD L. HUFF, Primary Examiner

U.S. Cl. X.R.

424—86, 87